Sept. 20, 1927.

I. K. RYSTEDT 1,642,971

MOTOR CAR

Filed April 22, 1925

Patented Sept. 20, 1927.

1,642,971

UNITED STATES PATENT OFFICE.

INGEMAR K. RYSTEDT, OF DAYTON, OHIO, ASSIGNOR OF ONE-HALF TO CHESTER R. SNYDER, OF DAYTON, OHIO.

MOTOR CAR.

Application filed April 22, 1925. Serial No. 24,974.

This invention relates to motor cars of a design and construction which define a radical departure from the conventional type of motor vehicle, having reference more especially to passenger automobiles.

An object attained in the invention consists in a full streamline design of the same to reduce head air pressure and to balance the air pressure on the top and under side of the car when the machine is in rapid motion and also to effect a radical departure from the conventional type of automobile which still retains the general characteristics of its immediate predecessor the horse drawn buggy or carriage. In my improved construction, the design is more distinctly a motor car.

A further object attained in the novel construction of the car consists in another radical departure from common practice in providing the chassis of the machine with pneumatic shock absorbing elements as distinguished from springs and various types of mechanical shock absorbers.

A novel feature of the car consists in enclosing the motor for propelling the machine within the main body portion thus to effect a full streamline construction and to gain the further advantage of heating the interior of the car in cold weather direct from the motor, adjustable windows being provided to afford ample ventilation in milder season.

A further feature of the novel construction of the car consists in the elimination of all projections, as fenders, foot boards, head lights, tire carriers, etc., all such equipment of the car being within the lateral body lines, the tendency of these parts, as applied on the common type of automobiles, to collide with adjacent machines being thus minimized.

Figure 1:
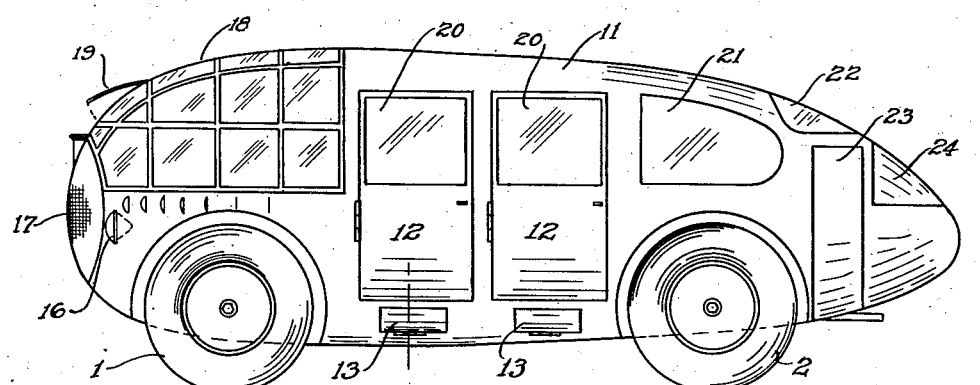
Fig. 1 is a side elevation of the car illustrating the general design.
Figure 2:
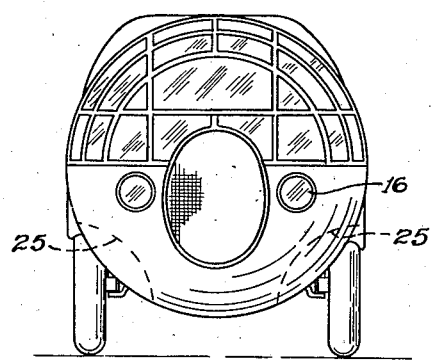
Fig. 2 is a front elevation.
Figure 3:
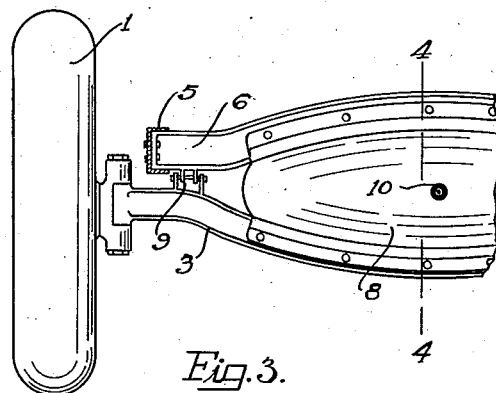
Fig. 3 is a detail of a front wheel axle, chassis frame and shock absorbing element.

My invention, as here shown, relates more especially to a principle of automobile construction along the line of modification which it is believed the general trend will be in the near future. It will be understood therefore that a mere conventional showing is made of features which are common in the present practice of automobile construction, and that the details generally, as here shown, serve merely to illustrate the novel principles upon which the improved car is constructed, it being understood that suitable modifications are contemplated in reducing the invention to commercial practice.

The chassis comprises the usual ground wheels 1 and 2, front and rear axles 3 and 4, bed frame 5, 6 and 7 and shock absorber or pneumatic cushioning element 8, the chassis frame being connected to the axles by means of shackles 9 arranged at each of the four corners.

The shock absorbing elements 8 consist of pneumatic bags or cushions adapted to be inflated by means of a valve 10, being thus adapted to be regulated as to pressure according to the load to be carried. The quiet, easy riding conditions of the car resulting from shock-absorbing elements interposed between front and rear axles and the complete elimination of springs which is thus made possible, will be readily apparent to operators of automobiles.

Figure 6:
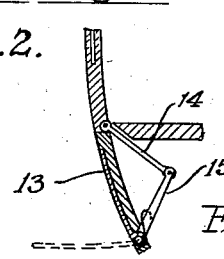
Fig. 6 is a detail of one of the side steps or foot boards.
Figure 4:
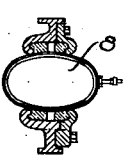
Fig. 4 is a cross-sectional view taken on line 4—4 of Fig. 3.
Figure 5:
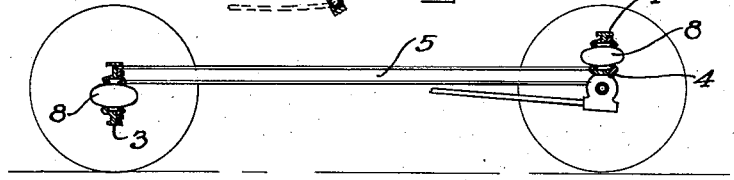
Fig. 5 is a longitudinal section of the chassis.

The body of the car consists in a "turtle-back" shell or housing 11, provided with doors 12, each door having a foldable step 13 operatively associated therewith by means of toggle levers 14—15 in a manner which causes the steps to be lowered outwardly when the doors are opened, as illustrated in Fig. 6, for the convenience of those entering the car, the steps again folding flush with the body upon closing of the doors, as illustrated in Fig. 1.

Both front and rear wheels, as here shown, are within the body lines, the body being undercut, as indicated at 25, to provide clearance for the front wheels required for steering, fenders and foot boards being thus entirely eliminated. The head lights 16 and radiator 17 are also constructed on lines conforming to the streamline design of the body. A glass enclosed housing 18 is provided at the front of the machine to afford ample means for observation and to admit light to the interior, certain of the panels, as shown at 19 being made adjustable for ventilating. The doors are also provided with glass panels 20 and the rear portion of the body with glass panels 21-22. A compartment for spare tires at the rear of the machine is closed by a door or removable panel 23 and another compartment for luggage by a lid or cover 24.

Figure 7:
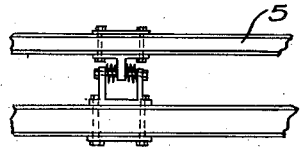
Fig. 7 is a detail of a shock absorber disposed on the chassis frame.

A modified construction of the chassis frame is illustrated in Fig. 7, a lower frame member 5ª being used in conjunction with frame 5 and a buffer or shock absorber comprising oppositely acting compression springs 26 supported in upper and lower brackets 27 and 28 secured to the chassis frames, to compensate for end thrust of the frames and to minimize the shocks to the machine, thus to further improve its riding qualities.

Having described my invention, I claim:

1. In an automobile, the combination of a full stream line body comprising a glass enclosed front motor housing and observation deck, passenger and auxiliary compartments, and external body attachments, side doors, all normally within the stream line of the body, and front and rear carriage wheels supported in laterally open recesses within the plane of the body.

2. In an automobile, the combination of a full stream line closed body comprising a glass covered observation deck disposed over the front of the body, a rear observation opening, and external body attachments all normally within the stream line of the body, and front and rear carriage wheels supported in laterally open recesses within the plane of the body.

In testimony whereof, I affix my signature.

INGEMAR K. RYSTEDT.